United States Patent
Engelhart

(10) Patent No.: US 7,263,347 B2
(45) Date of Patent: Aug. 28, 2007

(54) BIOMETRIC AUTHENTICATION OF A WIRELESS DEVICE USER

(75) Inventor: Robert L. Engelhart, Redmond, WA (US)

(73) Assignee: Cingular Wireless II, LLC, Atlanta, GA (US)

( * ) Notice: Subject to any disclaimer, the term of this patent is extended or adjusted under 35 U.S.C. 154(b) by 700 days.

(21) Appl. No.: 10/155,917

(22) Filed: May 24, 2002

(65) Prior Publication Data

US 2003/0220095 A1 Nov. 27, 2003

(51) Int. Cl.
  *H04M 1/66* (2006.01)
(52) U.S. Cl. .............. 455/410; 455/411; 455/456; 705/44; 705/78; 705/40
(58) Field of Classification Search ............... 455/410, 455/456.3, 563; 205/25, 1, 26, 42; 202/203; 213/185, 161, 186, 200; 55/411
  See application file for complete search history.

(56) References Cited

U.S. PATENT DOCUMENTS

| | | | |
|---|---|---|---|
| 4,947,028 A | 8/1990 | Gorog | |
| 5,715,314 A | 2/1998 | Payne et al. | |
| 5,757,917 A | 5/1998 | Rose et al. | |
| 5,794,221 A | 8/1998 | Egendorf | |
| 5,826,241 A | 10/1998 | Stein et al. | |
| 5,897,616 A | 4/1999 | Kanevsky et al. | |
| 5,907,831 A | 5/1999 | Lotvin et al. | |
| 5,909,492 A | 6/1999 | Payne et al. | |
| 5,920,847 A | 7/1999 | Kolling et al. | |
| 5,953,700 A | 9/1999 | Kanevsky et al. | |
| 5,999,611 A | 12/1999 | Tatchell et al. | |
| 6,016,476 A * | 1/2000 | Maes et al. | 705/1 |
| 6,023,682 A | 2/2000 | Checchio | |
| 6,029,150 A | 2/2000 | Kravitz | |
| 6,036,344 A | 3/2000 | Goldenberg | |
| 6,067,416 A | 5/2000 | Fraser | |
| 6,073,101 A | 6/2000 | Maes | |
| 6,118,860 A | 9/2000 | Hillson et al. | |

(Continued)

FOREIGN PATENT DOCUMENTS

EP  0982674  3/2000

(Continued)

OTHER PUBLICATIONS

Anon., printouts from iPIN Web site, 50 pp. [downloaded from the World Wide Web on May 29, 2003.].

(Continued)

*Primary Examiner*—Joseph Feild
*Assistant Examiner*—David Q. Nguyen
(74) *Attorney, Agent, or Firm*—Michael J. Donohue; Davis Wright Tremaine LLP

(57) ABSTRACT

A network storage location stores voice prints from a user of a wireless telephone. The voice prints are context-specific to likely responses to voice prompts from an interactive voice response (IVR) system. The voice prompts are communicated from the IVR to the wireless telephone. A voice selection is received from the wireless telephone. The voice selection is analyzed to determine a corresponding selection ID, and a voice print is retrieved from the storage location corresponding to the selection ID and to an ID of the wireless telephone.

17 Claims, 5 Drawing Sheets

U.S. PATENT DOCUMENTS

| | | | |
|---|---|---|---|
| 6,188,994 B1 | 2/2001 | Egendorf | |
| 6,206,283 B1 | 3/2001 | Bansal et al. | |
| 6,219,439 B1 | 4/2001 | Burger | |
| 6,269,348 B1 | 7/2001 | Pare, Jr. et al. | |
| 6,327,578 B1 | 12/2001 | Linehan | |
| 6,493,437 B1 | 12/2002 | Olshansky | |
| 6,505,171 B1 | 1/2003 | Cohen et al. | |
| 6,567,794 B1 | 5/2003 | Cordery et al. | |
| 2001/0007983 A1 | 7/2001 | Lee | |
| 2001/0037254 A1 | 11/2001 | Glikman | |
| 2001/0037264 A1 | 11/2001 | Husemann et al. | |
| 2001/0051924 A1 | 12/2001 | Uberti | |
| 2002/0019811 A1 | 2/2002 | Lapsley et al. | |
| 2002/0052841 A1 | 5/2002 | Guthrie et al. | |
| 2002/0055852 A1* | 5/2002 | Little et al. | 705/1 |
| 2002/0073046 A1 | 6/2002 | David | |
| 2002/0077837 A1 | 6/2002 | Krueger et al. | |
| 2002/0091937 A1* | 7/2002 | Ortiz | 713/200 |
| 2002/0174062 A1 | 11/2002 | Sines et al. | |
| 2002/0174177 A1* | 11/2002 | Miesen et al. | 709/203 |
| 2002/0174344 A1* | 11/2002 | Ting | 713/185 |
| 2002/0178122 A1 | 11/2002 | Maes | |
| 2003/0004881 A1* | 1/2003 | Shinzaki et al. | 705/51 |
| 2003/0023549 A1 | 1/2003 | Armes et al. | |
| 2003/0031321 A1* | 2/2003 | Mages | 380/270 |
| 2003/0040339 A1* | 2/2003 | Chang | 455/563 |
| 2003/0074317 A1 | 4/2003 | Hofi | |
| 2003/0074328 A1* | 4/2003 | Schiff et al. | 705/75 |
| 2003/0120615 A1 | 6/2003 | Kuo | |
| 2003/0130959 A1 | 7/2003 | Rosenbaum | |
| 2003/0163383 A1* | 8/2003 | Engelhart | 705/26 |
| 2003/0195935 A1* | 10/2003 | Leeper | 709/206 |

FOREIGN PATENT DOCUMENTS

| | | |
|---|---|---|
| EP | 1020824 | 7/2000 |
| WO | 98/19260 | 5/1998 |

OTHER PUBLICATIONS

Anon., "New Members Join NACHA's Internet Payment Project," *Electronic Payments International*, p. 3 (Jun. 2001).

Francella, "Food-Stamp Handling Made Easy," *Convenience Store News*, p. 54 (Jan. 16, 1995).

Taaffe, "Lack of Global Standards Spurs Regional Groups . . . But M-Payments Still Need to Be Easier," *Communications Week International*, No. 267, p. 15 (Jun. 18, 2001).

* cited by examiner

BIOMETRIC AUTHENTICATION OF A WIRELESS DEVICE USER

FIELD

The invention relates to wireless communication, and more particularly to biometric authentication of a wireless device user.

BACKGROUND

Increasingly, communication is accomplished via wireless technologies. Wireless devices such as cell phones, and personal digital assistants may be used to communicate voice and non-voice information using wireless signals over wireless networks. A wireless network is any communication system wherein wireless signals are communicated to and from wireless devices that utilize the system. The mobility associated with wireless communication creates a situation in which fraud and theft of services can become a significant problem.

The user of a wireless device may pay for access to certain functions of the wireless network. There is often an incentive for others to steal the functions paid for by the user. Certain other functions that the user performs via the wireless network may also be restricted. For example, the user may update their billing information (where to send bills, credit card info, etc.) via the wireless network. Access to such functions should normally be restricted to the user. One way to restrict access to functions of the network is to allow access only via authorized wireless devices. This may be accomplished, at least in part, by assigning a unique identifier to each wireless device and permitting access to restricted functions only via those devices associated with authorized users. An authorized user's wireless device may communicate a unique identifier to the wireless network in a secure fashion prior to accessing a restricted function. One limitation of this approach is that if an unauthorized third party gains possession of the authorized user's wireless device, they may then impersonate the authorized user to gain access to the restricted functions.

SUMMARY

A network storage location stores voice prints from a user of a wireless telephone. The voice prints are context-specific to likely responses to voice prompts from an interactive voice response (IVR) system. The voice prompts are communicated from the IVR to the wireless telephone. A voice selection is received from the wireless telephone. The voice selection is analyzed to determine a corresponding selection ID, and a voice print is retrieved from the storage location corresponding to the selection ID and to an ID of the wireless telephone.

DESCRIPTION

In the following figures and description, like numbers refer to like elements. References to "a" or "an" embodiment do not necessarily refer to the same embodiment, although they may. Lines of communication between two points (for example in FIGS. 2 and 4) do not necessarily indicate direct communication between the points, although they may.

Figure 1:
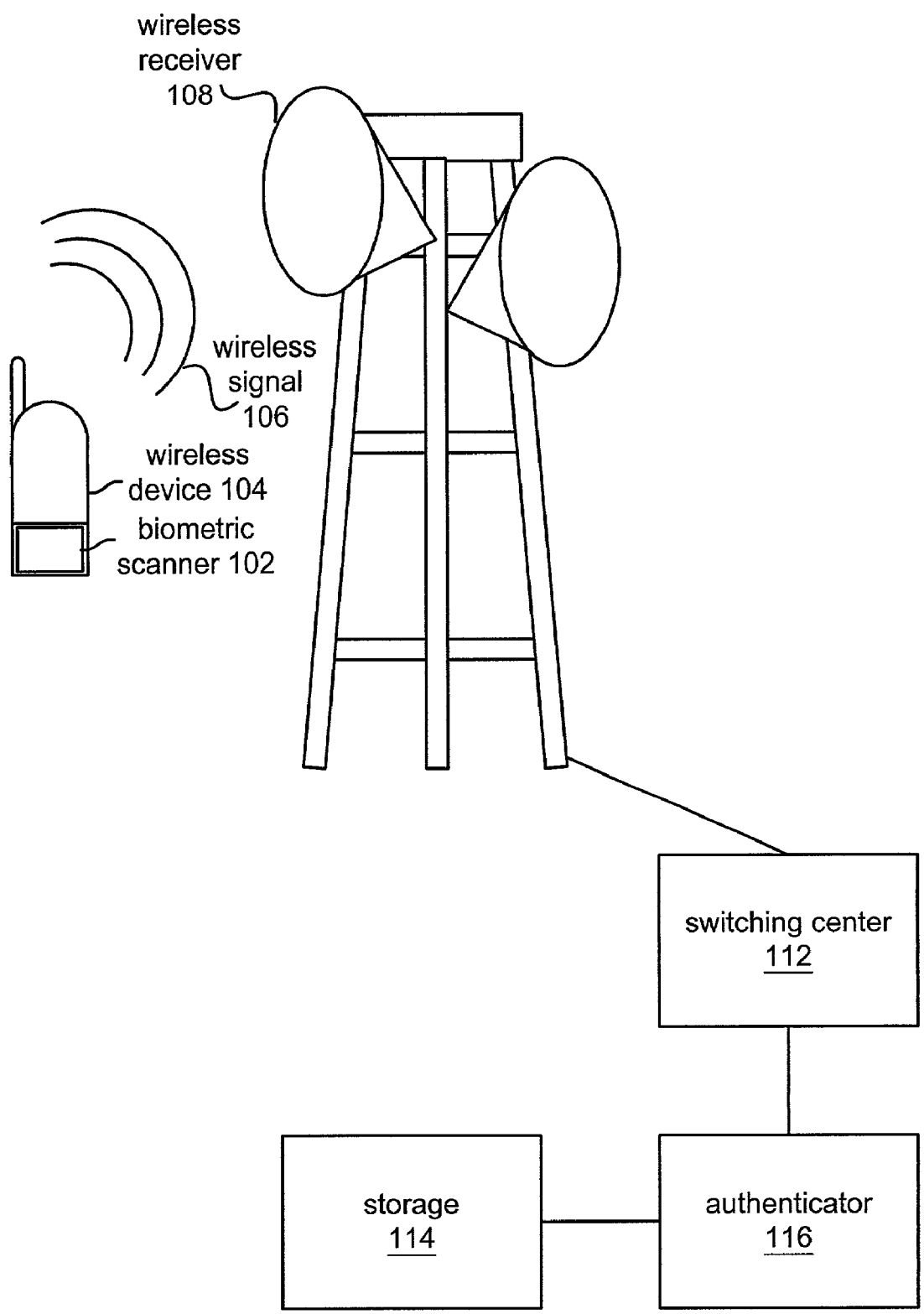
FIG. 1 is a block diagram of an embodiment of a system to biometrically authenticate the user of a wireless device.

With reference to FIG. 1, in a system to biometrically authenticate the user of a wireless device 104, the wireless device 104 is associated with a unique identifier that may be communicated wirelessly to the wireless receiver 108. In one embodiment the unique identifier may comprise a Mobile Station Identifier (MSID). An identifier (ID) is any sequence of symbols (whether binary or otherwise) including numbers, letters, and non-alphanumeric symbols.

The device 104 comprises a biometric scanner 102 to measure a biometric of the user, such as a fingerprint, a heart rhythm, a retinal pattern, and so on. Data representing the biometric is coded into a wireless signal 106 and communicated to a wireless receiver 108. Information representing the biometric is extracted from the wireless signal and communicated from the signal tower to the switching center 112. The switching center 112 comprises one or more switches and other devices and logic to route signals. The switching center 112 communicates the biometric information to an authenticator 116. The authenticator 116 may be implemented as software executing on a general purpose computer system. The authenticator 116 could also be implemented in electrical hardware circuits, or as a combination of hardware and software.

A biometric print corresponding to a user of the wireless device 104 is stored in storage 114. In one embodiment, the biometric print is associated with the unique identifier for the device 104. The biometric print is communicated from storage 114 to the authenticator 116. The authenticator 116 comprises logic to compare the biometric print to the biometric information provided from the wireless device 104, to authenticate the user of the wireless device 104.

Figure 2:
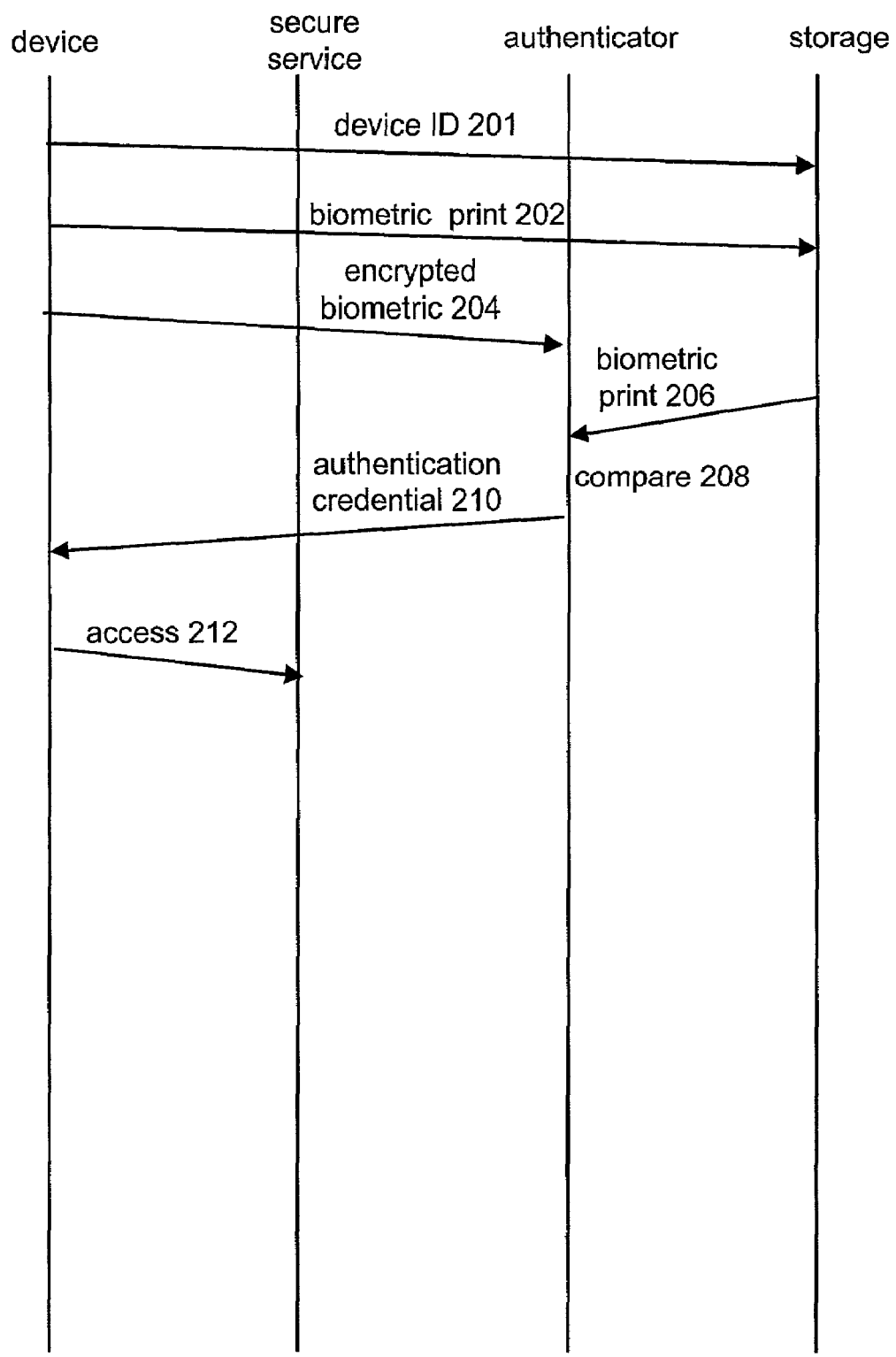
FIG. 2 is a flow chart of an embodiment of a method to biometrically authenticate the user of a wireless device.

With reference to FIG. 2, the device ID is communicated to the authenticator at 201. The biometric print is communicated at 202 and saved to a storage location. The biometric print may be provided from the wireless device, or from another source, such as a personal computer coupled to the storage location by way of the Internet and/or pubic phone network. At 204 the wireless device communicates biometric information to the authenticator. The biometric information may be encrypted, cryptographically signed, etc. to prevent and/or detect snooping and/or tampering with the biometric information during communication. At 206 the biometric print from storage is also communicated to the authenticator. The print may be located in storage using the device ID. At 208 the authenticator compares the biometric data provided from the wireless device with the biometric print. When the comparison produces a match, the authentication credentials are communicated by the authenticator to the wireless device at 210. The wireless device may employ the authentication credential to access the secure service of the wireless network at 212.

In another embodiment, the biometric print is recorded and stored in the wireless device. The wireless device performs the comparison of the biometric print with the biometric data to authenticate the user. The wireless device may then provide the switch center and/or other network component with an indication of successful authentication, to obtain access to a service of the network.

In general, it is contemplated that the biometric prints may be stored within the network (e.g. by a storage device of the network), or by the wireless device. It is also contemplated that the comparison of the biometric print with the biometric data may be performed by either the network (e.g. an authentication device of the network), or by the wireless device.

Recording and storage of the biometric print takes place prior to the communication involving authentication. Recording and storage of the biometric print may take place at the point of sale for the wireless device, in front of a certifying authority such as an employee of the company implementing the authentication service. Or, it may take place via the web, with a customer service representative, or through an automated mechanism such as an IVR. In general, any manner of pre-storing the biometric print is contemplated.

Figure 3:
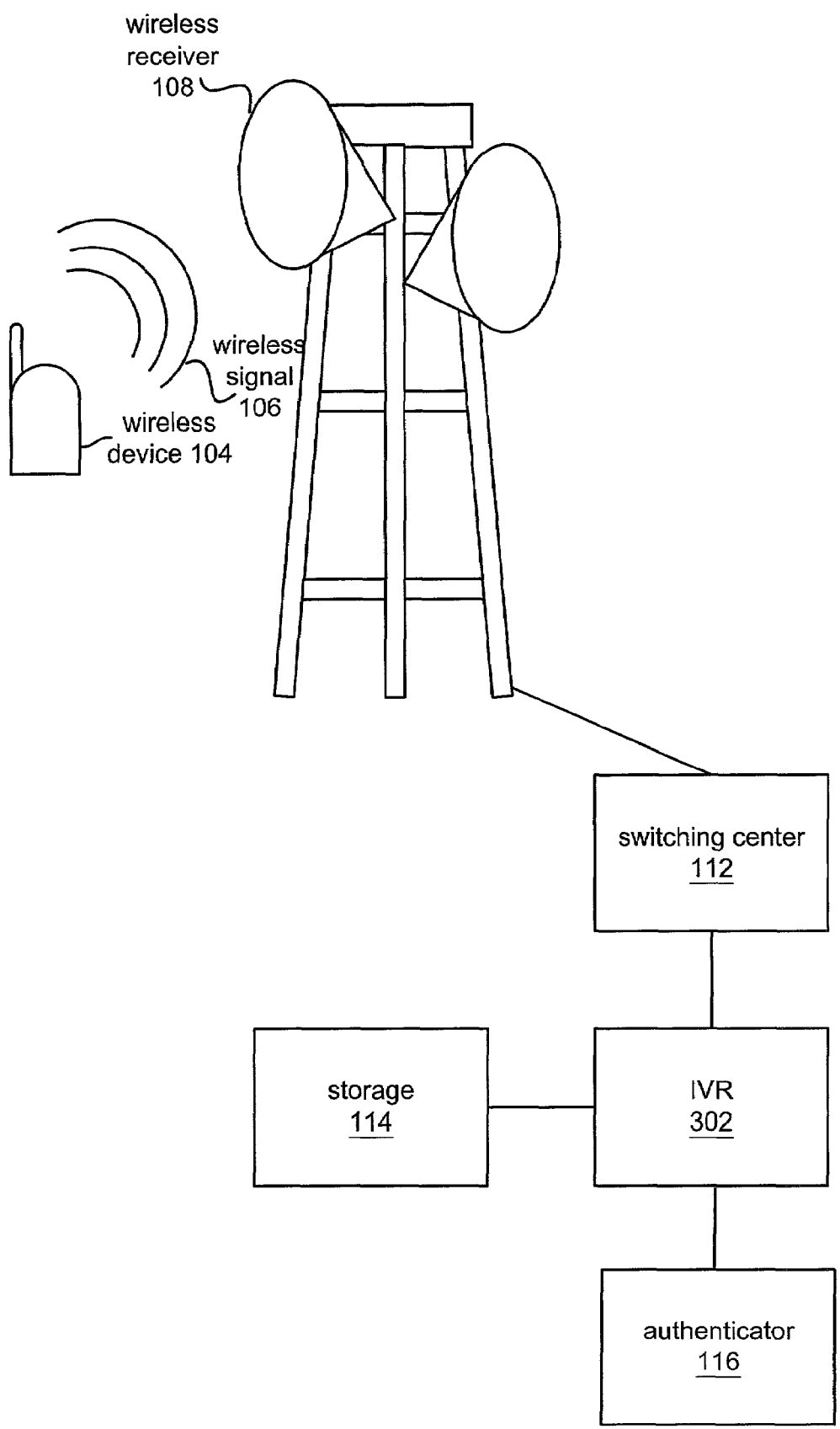
FIG. 3 is a block diagram of an embodiment of a system to biometrically authenticate the user of a wireless device according to a voice print.

FIG. 3 illustrates an embodiment of a system to biometrically authenticate the user of a wireless device according to the user's voice print. A wireless device 104 such as a cellular telephone typically comprises circuits and logic sufficient to measure the user's voice print, as the intended use of a cellular telephone is voice communications. The user's voice print may be encrypted by the wireless device 104 and communicated as a wireless signal 106 to the wireless receiver 108. The voice print is communicated from to the switching center 112, from which it may be communicated and stored in storage 114.

An interactive voice response system (IVR) is a system that receives and responds to selections communicated in the form of spoken word(s). The IVR 302 interprets voice selections communicated by the user to the wireless device 104 in response to selection choices (often in the form of voice prompts) from the IVR, and produces a corresponding selection ID. A voice selection is spoken words indicating a choice from among the selection choices communicated by the IVR. The selection ID, and the device ID, may then be used to locate a voice print stored in storage 114.

Figure 4:
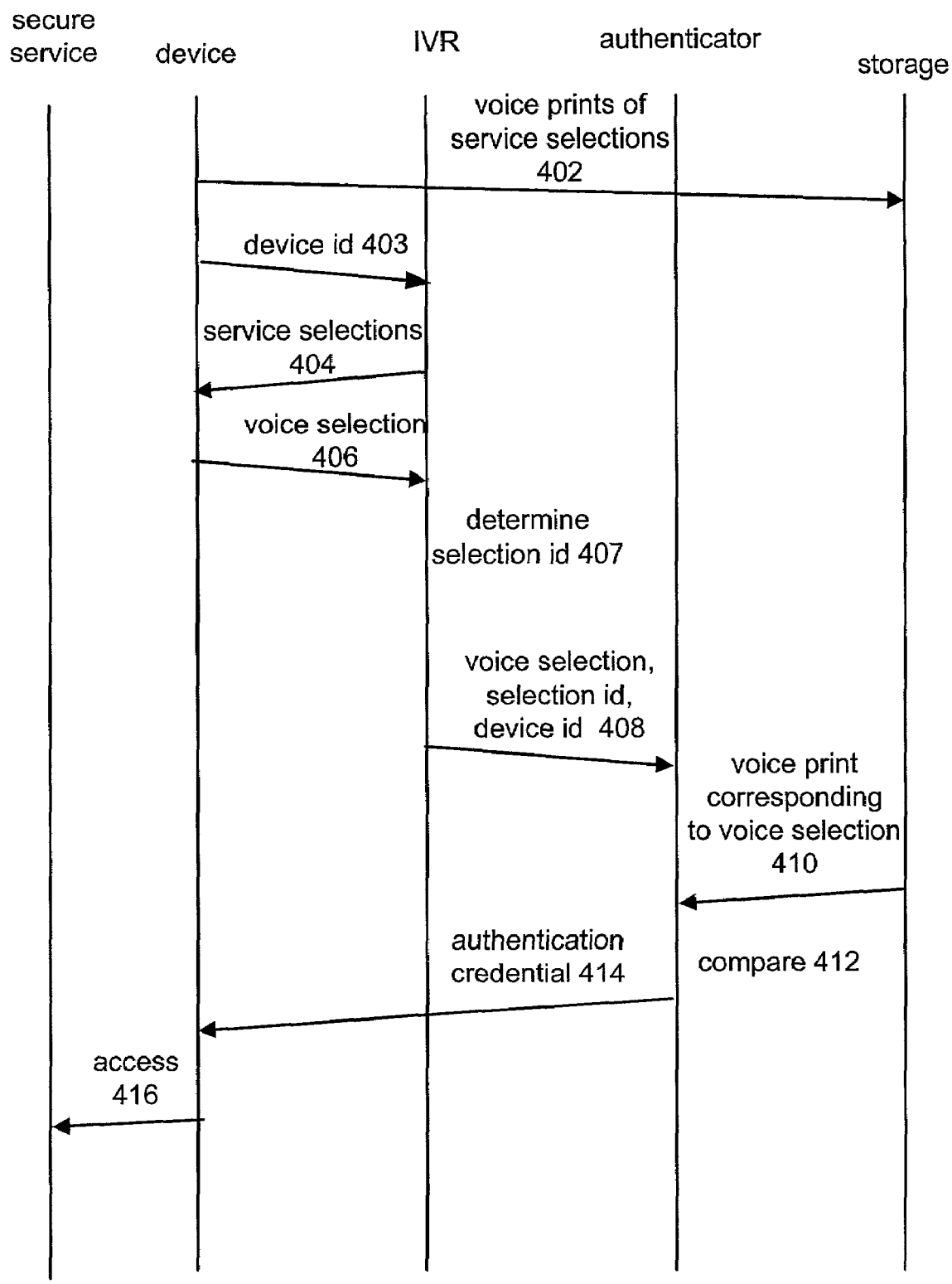
FIG. 4 is a flow chart of an embodiment of a method to biometrically authenticate the user of a wireless device according to a voice print.

FIG. 4 illustrates an embodiment of a method to authenticate a user of a wireless device according to the user's voice print. At 402 the voice print(s) of one or more service selections are communicated from the device to a storage location. The voice prints could have a point of origin other than the wireless device as well, for example from a microphone attached to a personal computer with Internet connectivity. The voice prints comprise the actual spoken words that a user of the wireless device would likely use in response to prompts from an IVR. In other words, the voice prints are context-specific to a likely response of the user to voice prompts or other selection choices provided by the IVR. For example, consider a situation in which the IVR prompts "What do you want to do?" and response options are "Update my Account" and "Change my Service Options". In this case the voice prints may include the words "Update", "Account", "Service" and "Options".

At 403 the wireless device accesses the wireless network and communicates its device ID, which eventually reaches the IVR. Of course, the device ID may pass through other stages of the network, including the switching center, before reaching the IVR. At 404 selections are communicated to the device by the IVR. The selections may be provided as printed menus displayed by the wireless device. More typically, the selections are voice prompts. At 406 the user communicates a voice selection to the IVR. At 407 the IVR analyzes the voice selection and determines a corresponding selection ID. For example, the IVR may perform signal processing to compare the voice selection to expected response patterns, and determine the selection ID according to a number of a matching pattern. At 408 the voice selection, device ID, and selection ID are communicated from the IVR to the authenticator. The authenticator employs the device ID and service selection ID to locate a voice print corresponding to the user of the wireless device, and corresponding to the voice selection. This voice print is communicated at 410 from storage to the authenticator. At 412 the authenticator compares the voice print to the voice selection, and if a match is obtained the authenticator generates an authentication credential. At 414 the authentication credential is communicated to the device. At 416 the device employs the authentication credential to access a secure service feature of the network corresponding to the voice selection.

In another embodiment, the voice prints are recorded and stored by the wireless device. The wireless device receives from the IVR the selection ID and locates the corresponding voice print. The wireless device compares the voice print with the voice selection to authenticate the user. The wireless device may then provide the switching center, IVR, and/or other network component with an indication of successful authentication, to obtain access to a feature of the network.

Figure 5:
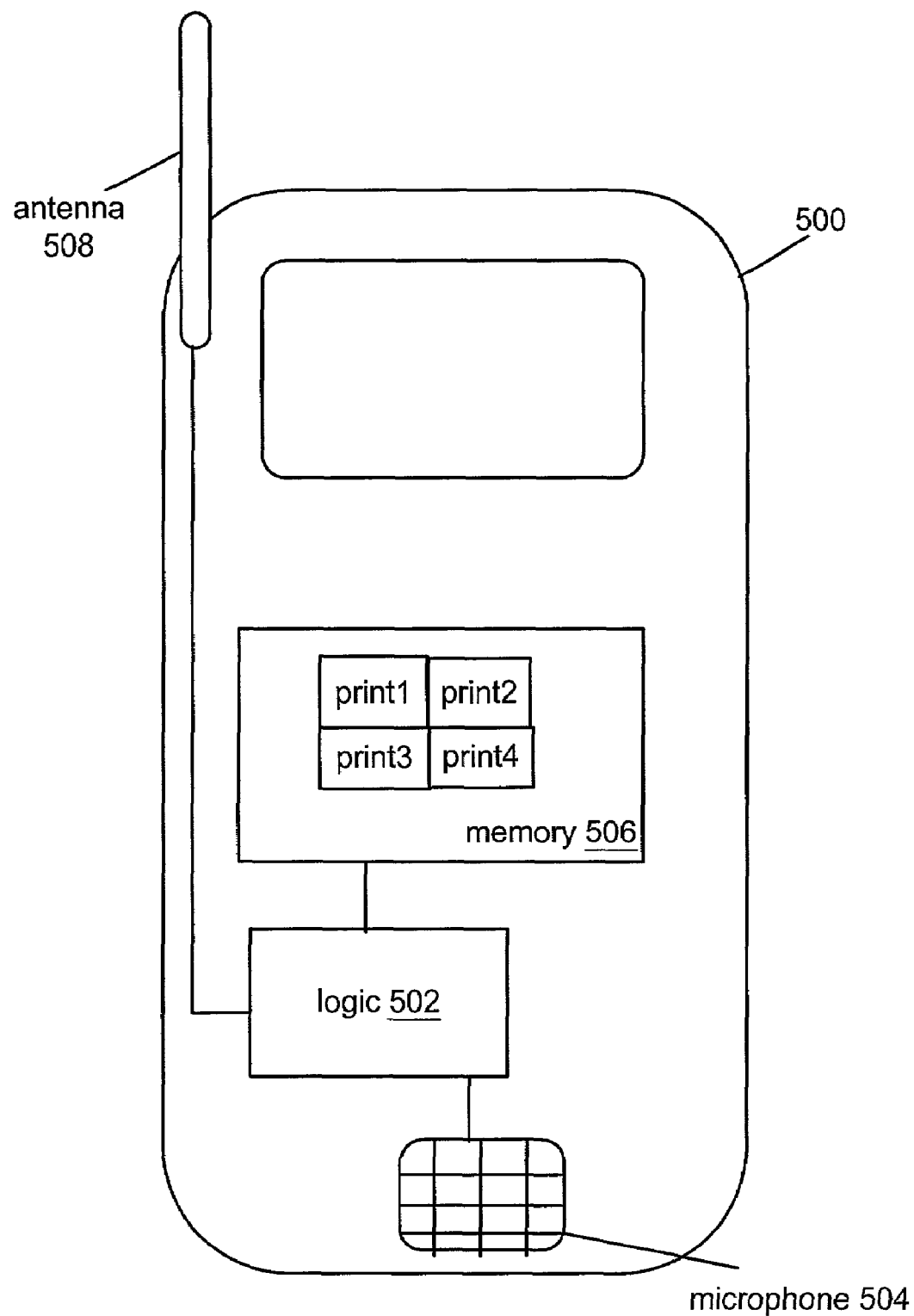
FIG. 5 illustrates an embodiment of a wireless telephone.

With reference to FIG. 5, a wireless telephone embodiment 500 includes an antenna 508 for communicating and receiving wireless signals. The phone 500 further comprises a memory 506 to store voice prints (print 1-print 4). A microphone 504 is may be employed to record a voice selection by converting sound into electrical signals. The microphone is coupled to logic 502, which receives signals from the microphone and stores them in the memory 506. Logic 502 may be implemented in software, hardware, firmware, or combinations thereof, including flash and read-only memory (ROM) implementations. The logic may operate to locate a voice print from among the voice prints stored in the memory 506, according to a selection ID received from the network. The logic 502 is coupled to the antenna 508, to receive, for example, the selection ID from the network, and to generate and communicate to the network an indication that the comparison produces a match. The logic 502 may further operate to encrypt the indication of the match to prevent tampering and impersonation by parties that may intercept the communication of the indication to the network.

In general, it is contemplated that the voice prints may be stored by a storage device of the network, or by the wireless device. It is also contemplated that the comparison of the voice print with the voice selection may be performed by either a device of the network, or by the wireless device.

Particular embodiments of a method and apparatus have been described herein. Many alternative embodiments will now become apparent to those skilled in the art. It should be recognized that the described embodiments are illustrative only and should not be taken as limiting in scope. Rather, the present invention encompasses all such embodiments as may come within the scope of the following claims and equivalents thereto.

What is claimed:

1. A method for authenticating a user of a wireless telephone on a wireless network, the method comprising:

storing at a network storage location voice prints from the user of the wireless telephone, the voice prints context-specific to responses to voice prompts from an interactive voice response (IVR) system of the wireless network;
receiving an ID of the wireless telephone;
communicating one or more of the voice prompts from the IVR system to the wireless telephone;
receiving a voice selection from the wireless telephone;
with the IVR system of the wireless network, analyzing the voice selection received from the wireless telephone to determine a corresponding selection ID;
retrieving from the network storage location a voice print from among the stored voice prints, the retrieved voice print corresponding to the selection ID and to the ID of the wireless telephone; and
generating authentication credentials when the retrieved voice print matches at least a portion of the voice selection.

2. The method of claim 1 further comprising:
authenticating the user to access a network feature when the retrieved voice print matches the voice selection.

3. The method of claim 1 wherein the voice selection is encrypted when received from the wireless telephone.

4. The method of claim 1 wherein the voice prompts include plural selection choices communicated from the IVR system.

5. The method of claim 1 wherein the voice prompts include a question communicated from the IVR system, and wherein the voice selection includes an answer to the question.

6. A wireless network system comprising:
an interactive voice response (IVR) system of the wireless network to generate a selection ID corresponding to a voice selection received from a wireless device;
a storage device to store voice prints of at least one user of at least one wireless device, the stored voice prints context-specific to responses to voice prompts provided by the IVR system; and
an authenticator to receive the selection ID from the IVR system and a wireless device ID and to locate a voice print among the stored voice prints according to the selection ID and the wireless device ID, the authenticator comprising logic to compare the voice selection and the located voice print and to produce authentication credentials when the comparison produces a match.

7. The system of claim 6 further comprising:
logic to employ the authentication credentials to provide access to a network feature to the wireless device.

8. The system of claim 6 wherein the voice prompts include plural selection choices communicated from the IVR system.

9. The system of claim 6 wherein the voice prompts include a question communicated from the IVR system, and wherein the voice selection includes an answer to the question.

10. A method for authenticating a wireless phone user on a wireless network comprising:
store at a network storage device plural biometric prints;
receiving an ID of a wireless phone;
receiving biometric information from the wireless phone;
with a network component of the wireless network, determining a selection ID from the biometric information received from the wireless phone;
retrieving from the network storage device a biometric print from among the plural stored biometric prints, the retrieved biometric print corresponding to the selection ID and the ID of the wireless phone;
comparing the retrieved biometric print with at least a portion of the biometric information; and
enabling the wireless phone to access a network feature when the retrieved biometric print matches the at least a portion of the biometric information.

11. A method for authenticating a wireless device user on a wireless network, the method comprising:
upon access to the wireless network by a wireless device, receiving an ID of the wireless device;
receiving a voice selection from the wireless device;
with a network component of the wireless network, determining a selection ID corresponding to the voice selection received from the wireless device;
retrieving from storage at a network storage location a voice print corresponding to the selection ID and to the ID of the wireless device;
comparing the voice print with at least a portion of the voice selection; and
generating authentication credentials when the voice print matches the at least a portion of the voice selection.

12. The method of claim 11 further comprising:
providing a voice prompt to the wireless device; and
the voice print context-specific to a response to the voice prompt.

13. The method of claim 11 wherein the network component is an interactive voice response (IVR) system, the method further comprising:
the IVR system providing a voice prompt to the wireless device;
the IVR system receiving the voice selection from the wireless device; and
the IVR system processing the voice selection to determine the selection ID.

14. The method of claim 13 further comprising:
providing the wireless device with access to a network feature as a result of the match between the voice print and the at least a portion of the voice selection.

15. The method of claim 14 wherein the wireless device is a wireless telephone.

16. A method for authenticating a wireless device user on a wireless network, the method comprising:
recording at a network storage location at least one voice print that is context specific to at least one voice selection;
upon access to the wireless network by a wireless device, receiving an ID of the wireless device;
receiving a voice selection from the wireless device;
analyzing the voice selection received from the wireless device with a network component of the wireless network to generate a selection ID;
selecting from the at least one recorded voice print a voice print corresponding to the selection ID and to the ID of the wireless device;
comparing the selected voice print with at least a portion of the received voice selection; and
generating authentication credentials when the selected voice print matches the at least a portion of the received voice selection.

17. The method of claim 16 further comprising:
the wireless device receiving a voice prompt; and
the selected voice print context-specific to a response to the voice prompt.

* * * * *